United States Patent
Kim et al.

(10) Patent No.: US 9,233,665 B2
(45) Date of Patent: Jan. 12, 2016

(54) WIPER BLADE

(71) Applicant: KCW Corporation, Daegu (KR)

(72) Inventors: Tae Kyeong Kim, Daegu (KR); Kwan Hee Kim, Daegu (KR); Jae Hyuck An, Daegu (KR)

(73) Assignee: KCW CORPORATION (KR)

( * ) Notice: Subject to any disclaimer, the term of this patent is extended or adjusted under 35 U.S.C. 154(b) by 55 days.

(21) Appl. No.: 13/673,600

(22) Filed: Nov. 9, 2012

(65) Prior Publication Data

US 2013/0305478 A1    Nov. 21, 2013

(30) Foreign Application Priority Data

Nov. 9, 2011 (KR) .................. 10-2011-0116272

(51) Int. Cl.
*B60S 1/38* (2006.01)
*B60S 1/04* (2006.01)

(52) U.S. Cl.
CPC ............. *B60S 1/3801* (2013.01); *B60S 1/0491* (2013.01); *B60S 1/3806* (2013.01); *B60S 2001/3813* (2013.01); *B60S 2001/3815* (2013.01); *B60S 2001/3843* (2013.01)

(58) Field of Classification Search
CPC .................. B60S 1/3801; B60S 1/3806; B60S 2001/3813; B60S 2001/3815
USPC ............. 15/250.46, 250.44, 250.361, 250.39, 15/250.201
See application file for complete search history.

(56) References Cited

U.S. PATENT DOCUMENTS

| 6,785,931 B2 * | 9/2004 | Lee et al. ................... 15/250.46 |
| 6,859,985 B1 * | 3/2005 | Nakazawa et al. ............. 29/428 |
| 8,375,504 B2 * | 2/2013 | Kim et al. .................. 15/250.32 |
| 2010/0139027 A1 * | 6/2010 | An et al. .................. 15/250.361 |
| 2011/0083295 A1 | 4/2011 | Kim et al. |

FOREIGN PATENT DOCUMENTS

| CN | 2200568 | 6/1995 |
| CN | 101746357 | 6/2010 |
| CN | 101959726 | 1/2011 |
| CN | 102039874 | 5/2011 |
| DE | 102010032868 | 3/2011 |
| JP | 2006327589 | 12/2006 |
| JP | 2011084270 | 4/2011 |
| KR | 1019980001543 | 3/1998 |
| KR | 100937206 | 1/2010 |

(Continued)

OTHER PUBLICATIONS

Corresponding Notice of Allowance issued by the KIPO dated Oct. 28, 2013.

(Continued)

*Primary Examiner* — Monica Carter
*Assistant Examiner* — Stephanie Berry
(74) *Attorney, Agent, or Firm* — The Belles Group, P.C.

(57) ABSTRACT

A wiper blade. In one aspect, the wiper blade includes a wiper strip which directly wipes a wiping surface; a lever assembly which supports the wiper strip; and a cover which receives the lever assembly, wherein the lever assembly supports six points of the wiper strip by means of a pair of first levers, each of which supports two points of the wiper strip, and a pair of second levers, each of which is hinge-coupled to the first lever, is coupled to the cover and supports one point of the wiper strip.

11 Claims, 12 Drawing Sheets

(56) References Cited

FOREIGN PATENT DOCUMENTS

| | | | |
|---|---|---|---|
| KR | 1020100064983 | | 6/2010 |
| KR | 1020110040262 | | 4/2011 |
| WO | WO 0108948 | * | 2/2001 |
| WO | WO 0108948 A1 | * | 2/2001 |
| WO | 2010035794 | | 4/2010 |

OTHER PUBLICATIONS

Corresponding Office Action issued by the JPO dated Dec. 10, 2013.
Corresponding Office Action issued by SIPO dated Jul. 21, 2014.
Office Action issued by the JPO on Jul. 15, 2014.

* cited by examiner

ID
WIPER BLADE

CROSS-REFERENCE TO RELATED APPLICATIONS

This application claims the benefit of Korean Patent Application No. 10-2011-0116272, filed Nov. 9, 2011, the entirety of which is hereby incorporated by reference.

FIELD OF THE INVENTION

The present invention relates to a wiper blade and more particularly to a wiper blade allowing wiping to be stably performed white driving.

BACKGROUND OF THE INVENTION

In general, a wiper blade removes impurities, snow, rain or the like when driving and prevents a driver's front sight from being deteriorated and performs a repetitive reciprocating action in a fan shape as a motor drives a link apparatus connected to a wiper arm.

A conventional wiper blade includes a lever assembly configured by connecting levers of metal materials in a tournament type. In the lever assembly, a plurality of tournament levers curve a wiper strip, so that the wiper strip having a backing plate installed therein traces a curvature of a vehicle glass.

The wiper blade has a problem in that the wiper blade lifts by an air pressure applied to a glass surface when the vehicle is driven at a high speed and chattering occurs.

SUMMARY OF THE INVENTION

An aspect of the present invention is a wiper blade. The wiper blade includes: a wiper strip which directly wipes a wiping surface; a lever assembly which supports the wiper strip; and a cover which receives the lever assembly. The lever assembly supports six points of the wiper strip by means of a pair of first levers, each of which supports two points of the wiper strip, and a pair of second levers, each of which is hinge-coupled to the first lever, is coupled to the cover and supports one point of the wiper strip.

Another aspect of the present invention is a wiper blade. The wiper blade includes: a wiper strip which directly wipes a wiping surface; a lever assembly which supports the wiper strip and includes two pairs of first levers and a pair of second levers; and a cover which receives the lever assembly. Each of a pair of the second levers is coupled to the cover and is hinge-coupled to a pair of the first levers. Each of two pairs of the first levers supports two points of the wiper strip.

The cover includes a fixing cover and at least one moving cover which is pivotable with respect to the fixing cover. The moving cover is fixed and coupled to the second lever and is located on both ends of the fixing cover. The wiper blade farther includes a first spacer which is provided in a central portion of the second lever, pressurizes the second lever from the outside of the second lever and is made of a resin material. The wiper blade further includes a spacer clip which is inserted between the first spacer and the fixing cover, has an arch-shaped cross section and is made of a metallic material. The spacer clip includes a spacer rib and an elastic latch. The spacer rib allows the spacer clip is coupled in a sliding manner to a slot formed within the fixing cover. The elastic latch is caught by the outer end portion of the slot and restrains the backward movement of the spacer clip.

The wiper blade further includes a second spacer which is provided in one end of the second lever, pressurizes the first lever and is made of a resin material. An axial direction cross section of a lower space of the second lever has a trapezoidal shape. A distance between first fasteners of the first lever is increased or decreased according to a curvature of the wiping surface.

Further another aspect of the present invention is a wiper blade. The wiper blade includes: a wiper strip which directly wipes a wiping surface; a lever assembly which supports the wiper strip; and a cover which receives the lever assembly. A transverse centerline of the lever assembly is offset from a transverse centerline of the wiper strip to the rear side of a vehicle.

The cover includes a fixing cover and at least one moving cover which is pivotable with respect to the fixing cover. The at least one moving cover is fixed and coupled to the second lever and is located on both ends of the fixing cover. The cover includes finned sections which form an upper front end of the cover are integrally formed with the cover in such a manner as to be as a whole concave toward the wiper strip.

BRIEF DESCRIPTION OF THE DRAWINGS

The embodiment will be described in detail with reference to the following drawings.

DETAILED DESCRIPTION OF THE INVENTION

Figure 1:
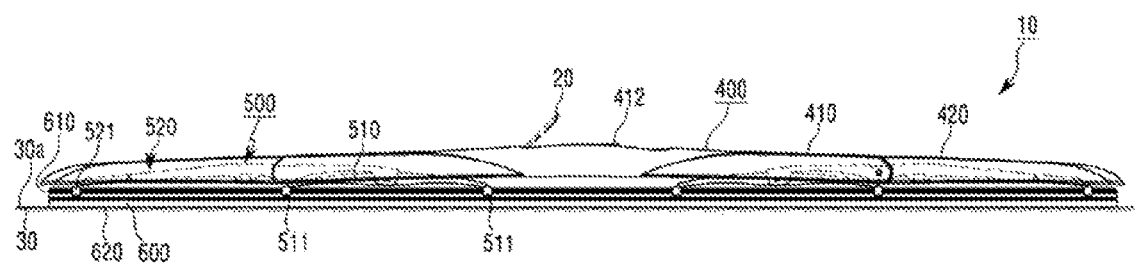
FIG. 1 is a front view of a whole configuration of a wiper blade according to the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

Hereinafter, the present invention will be described with reference to the accompanying drawings. A detailed description of the components of the present invention which can be clearly grasped and easily implemented by those skilled in the art through the prior arts will omitted not to make the subject matter of the present invention unclear.

Figure 2:
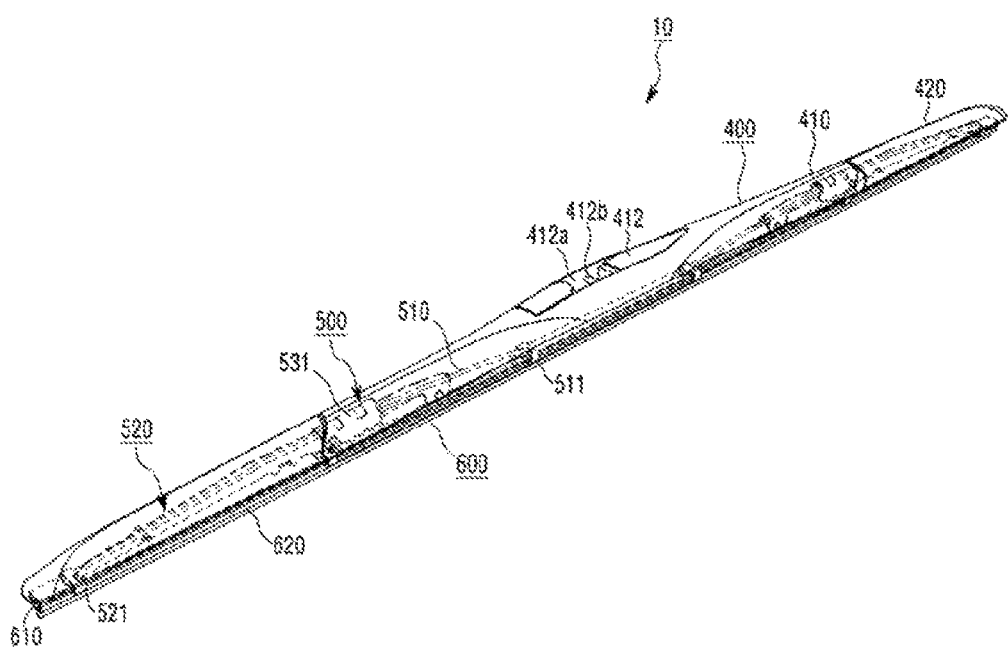
FIG. 2 is a perspective view of the whole configuration of the wiper blade according to the present invention.

FIGS. 1 and 2 are a front view and a perspective view showing a wiper blade according to the present invention. Referring to FIGS. 1 and 2, a wiper blade 10 according to the present invention includes a wiper strip 600 coming into contact with a window glass surface of a vehicle to wipe the window glass surface of the vehicle, a lever assembly 500 connected to each other in a tournament type and configured to support the wiper strip 600, and a cover 400 for receiving the lever assembly 500.

Hereinafter, the wiper blade shown in FIGS. 1 and 2 will be described in detail. The wiper blade 10 is connected to the front end of the wiper arm (not shown), and receives a pressurizing force from the wiper arm with respect to a glass surface 30a (a wiping surface) of vehicle glass 30. The wiper arm is reciprocately rotated at a predetermined angle by a wiper motor (not shown), and the wiper blade 10 wipes on the glass surface 30a within a range of the predetermined angle.

Figure 3A:
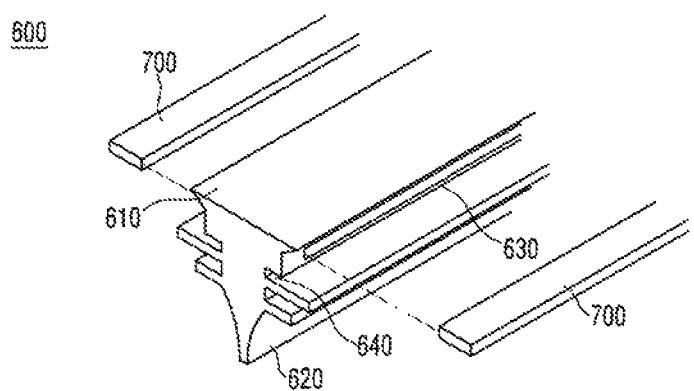
FIG. 3a is a perspective view of one end of a wiper strip according to the present invention.
Figure 3B:
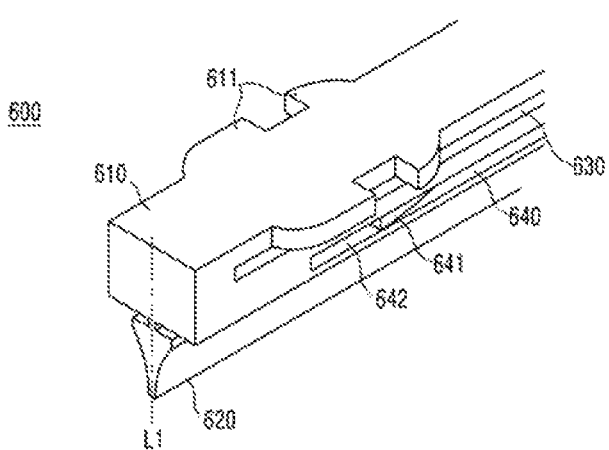
FIG. 3b is a perspective view of the other end of the wiper strip according to the present invention.

FIGS. 3a and 3b are partial perspective views showing respectively one end and the other end of the wiper strip 600. As shown in FIGS. 1, 2, 3a, and 3b, the wiper blade 10 further includes two backing plates 700 mounted to the wiper strip 600. The lever assembly 500 includes a plurality of first levers 510 and a plurality of second levers 520. For convenience of description of the present invention, the wiper blade 10 comprised of a pair of the first levers 510 and a pair of the second levers 520 will be described.

Referring to FIGS. 1, 2, 3a and 3b, the wiper strip 600 includes a wiping lip part 620 directly coming into contact with the glass surface 30a to perform the wiping action, and a base part 610 supported by the lever assembly 500. The wiper strip 600 is disposed to slidably come into contact with the glass of the vehicle and removes a foreign material from a surface of the glass. The wiper strip 600 extends in a longitudinal direction and is made of an elastic material such as a rubber material or an elastic synthetic material.

The base part 610 is supported by fasteners 511 and 521 of a first lever 510 and a second lever 520 of the lever assembly 500. The fasteners 511 and 521 may have a yoke shape. The base part 610 and the wiping lip part 620 continuously extend in a longitudinal direction of the wiper strip 600. A receiving groove 630 for receiving the two backing plates parallel to each other in the longitudinal direction extends on the base part 610. The two backing plates 700 corresponding to rectangular metal material plates having spring properties are received in two backing plate receiving grooves 630, respectively. A holding part 640 is a part for receiving the fasteners 511 and 521 in a sliding type.

The holding part 640 at one end of the wiper strip 600 shown in FIG. 3a is an open type capable of receiving the fasteners 511 and 521, but the other end shown in FIG. 3b is formed to restrict a longitudinal direction movement of the second fastener 521 of the second lever. That is, one of the second fasteners 521 of the second lever 520 is restricted by a wall of a slope 641 and a coupling part 642 provided only at the other end of the holding part 640. Further, the longitudinal direction movement of the second fastener 521 is restricted by a protrusion part 611.

The backing plate 700 applies elasticity and stiffness to the wiper lip part 620. When a pressurizing force is applied from the wiper arm, the pressurizing force is distributed to the wiper strip 600 through the lever assembly 500. At this time, the pressurizing force spreads in the longitudinal direction of the wiper strip 600 by the backing plate 700. Accordingly, the backing plate 700 should have elasticity and stiffness to maintain a shape of the wiper strip 600. The number of backing plates 700 and backing plate receiving grooves 630 may be two or more according to a degree of stiffness or elasticity of the wiper strip.

Figure 4:
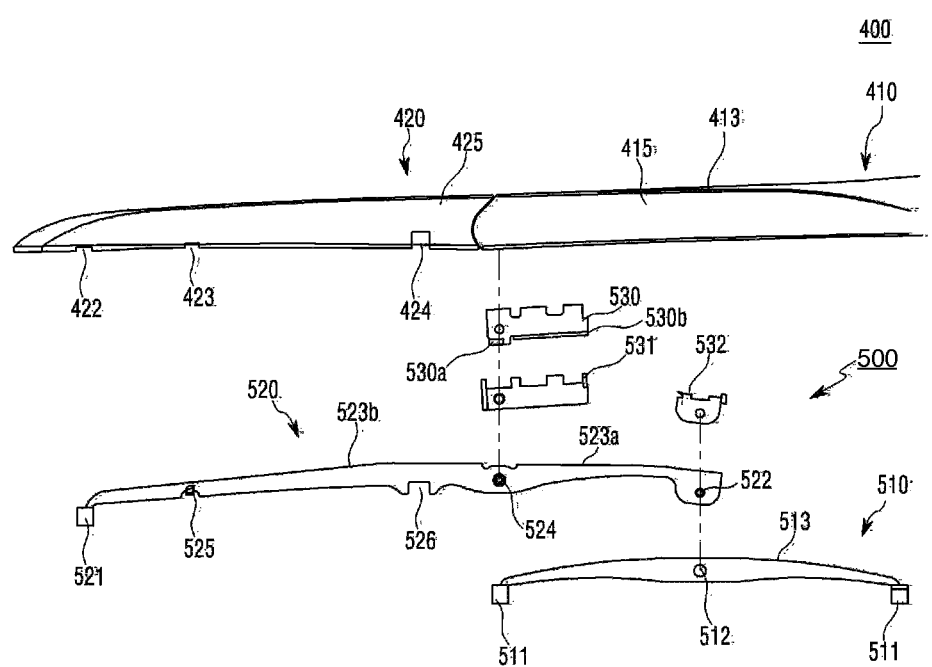
FIG. 4 is a front exploded view showing a cover and a lever assembly of the wiper blade according to the present invention.
Figure 5:
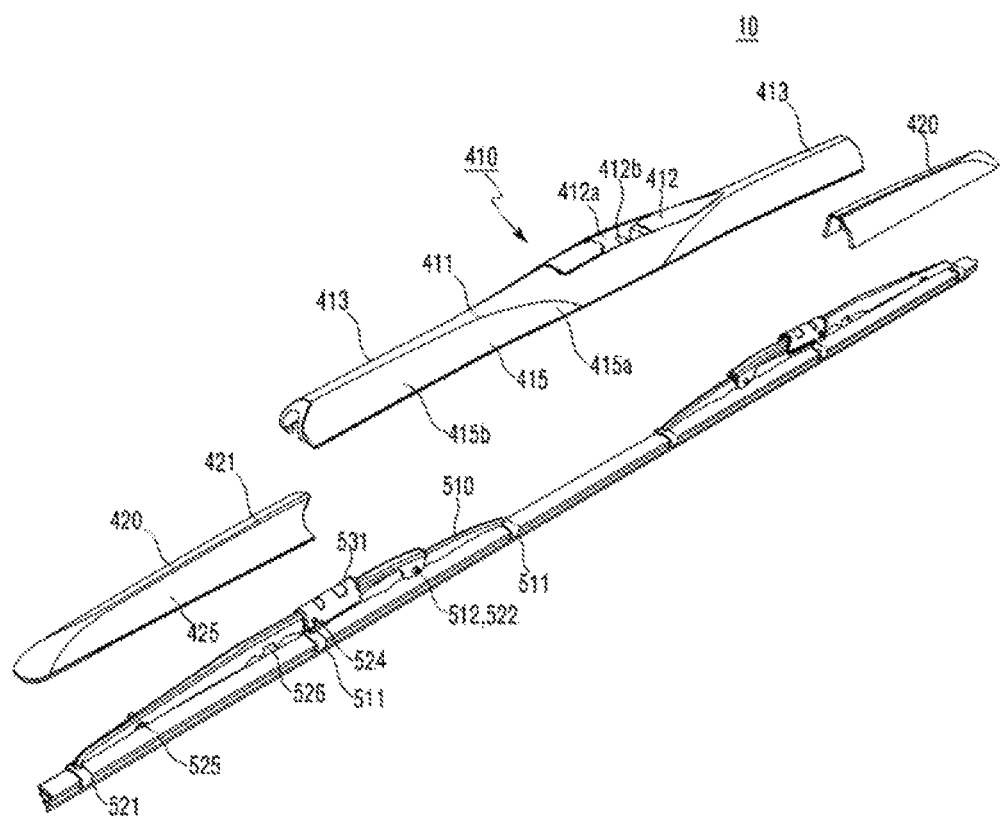
FIG. 5 is a perspective view of the cover and the lever assembly of the wiper blade separated from each other according to the present invention.

FIG. 4 is a front exploded view showing a cover and a lever assembly of the wiper blade according to the present invention. FIG. 5 is a perspective view of the cover and the lever assembly of the wiper blade separated from each other according to the present invention. Referring to FIGS. 1, 2, 4 and 5, according to an embodiment of the present invention, the lever assembly 500 includes a pair of first levers 510 and a pair of second levers 520 hinge-coupled to the first levers 510 and coupled to the cover 400.

The lever assembly 500 and the cover 400 distribute a pressurizing force applied from the wiper arm to the wiper strip 600. The first lever 510 is coupled to a wiper center directional front end of the second lever 520, and hinge-coupled to rotate about a coupling axis of the first lever 510.

According to the embodiment of the present invention, the first lever 510 may be provided at a position spaced apart from a center of the wiper blade 10 by a predetermined distance. One end of the second lever 520 is hinge-coupled to the first lever 510 and a central portion of the second lever 520 is coupled to the cover 400. The other end of the second lever 520 supports the wiper strip 600. For example, it is possible to obtain a six-point support structure in which a pair of the first levers 510 supports four points and a pair of the second levers 520 supports two points. That is, each of the pair of the first levers 510 supports two points of the wiper strip 600. Each of the pair of the second levers 520 supports one point of the wiper strip 600. By doing this, the lever assembly 500 including a pair of the first levers 510 and a pair of the second levers 520 are able to as a whole support six points of the wiper strip 600. When the wiper strip 600 is supported by the six-point support structure, the second lever 520 is able to sufficiently pressurize the end of the wiper strip.

In general, the longitudinal central portion of the backing plate 700 inserted into the wiper strip 600 is concavely curved separately from the glass surface 60*a*. For instance, when the lever assembly 500 is not able to pressurize both ends of the wiper strip 600, a pressurizing force given to the lever assembly 500 may not be distributed to the entire wiper strip 600. Therefore, for the purpose of stable wiping, the curvature of the backing plate 700 should be larger than that of the glass surface 30*a*. In other words, the curvature radius 600 of the backing plate 700 should be smaller than that of the glass surface 30*a*.

However, according to the embodiment of the present invention, the six-point support structure of the lever assembly 500 is able to distribute, in a longitudinal direction of the wiper strip 600, the pressurizing force given to the lever assembly 500. Therefore, the curvature of the backing plate 700 may be smaller than that of the glass surface 30*a* or the backing plate 700 may have no curvature. It spends a lot of processing time to correctly adjust the curvature of the backing plate 700 in accordance with the pressurizing force applied to the wiper blade 10. The six-point support structure of the lever assembly 500 according to the embodiment of the present invention is able to stably distribute a load to the wiper strip 600 by using the backing plate 700 having a small curvature or no curvature.

Figure 6A:
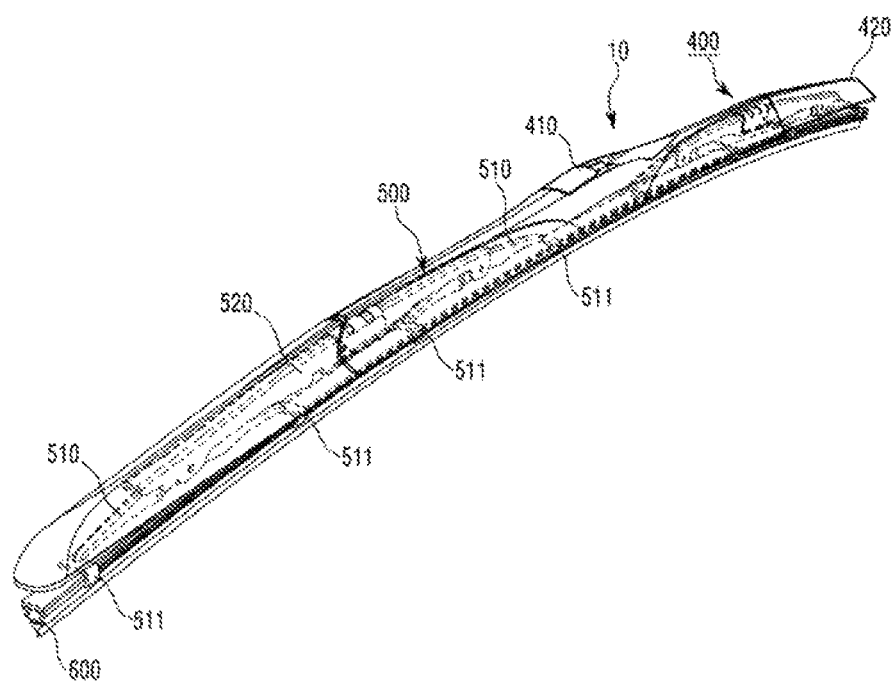
FIGS. 6a and 6b are a perspective view and an exploded perspective view of the wiper blade having an eight-point support structure.
Figure 6B:
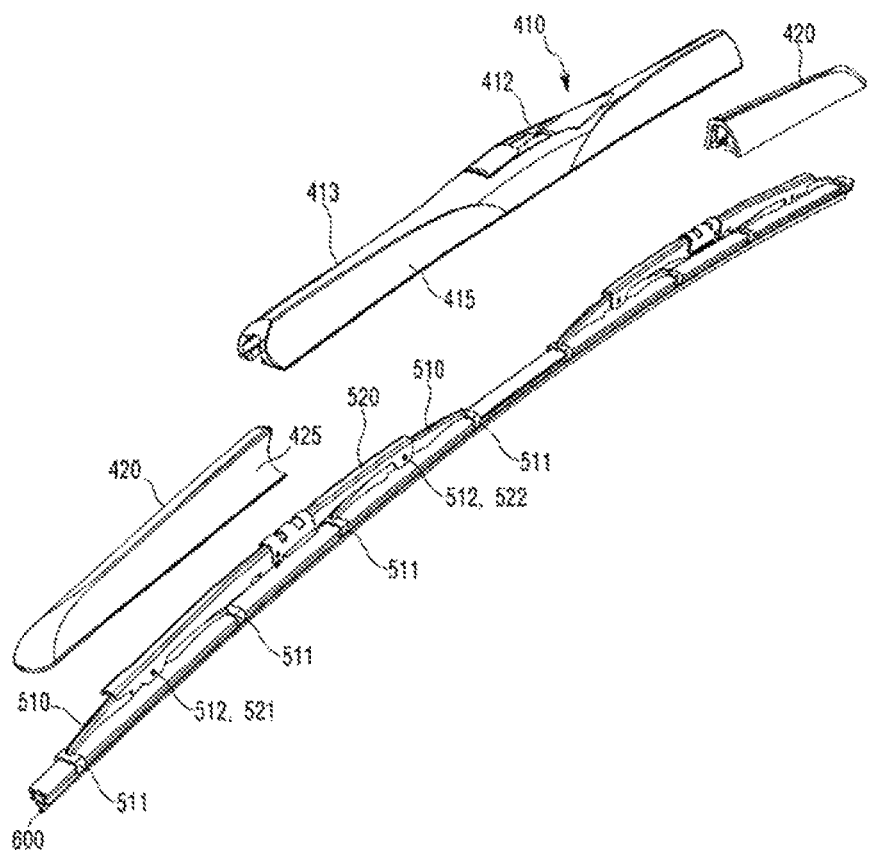

FIGS. 6*a* and 6*b* show the wiper blade having an eight-point support structure. If the glass surface of a vehicle becomes larger, the wiper blade 10 also becomes longer. Here, for the purpose of more stably pressurizing the wiper strip 600 to the glass surface, supporting points more than those of the six-point support structure are required.

Referring to FIGS. 6*a* and 6*b*, the lever assembly 500 may include a pair of the second levers 520 and two pairs of the first levers 510. The two pairs of the first levers 510 are able to support the wiper strip 600 at two points respectively in such a manner as to be slidable. That is, the blade 10 having the eight-point support structure is provided. Both ends of each of the second levers 520 may be hinge-coupled to a pair of the first levers 510. Both ends of each of the first levers 510 may include a pair of fasteners 511. Since characteristics other than the eight-point support structure are the same as those of the wiper blade of the above-described six-point support structure, more description thereof will be omitted.

Referring to FIGS. 1 to 5, the first lever 510 supports the base part 610 of the wiper strip 600. According to the embodiment of the present invention, the first lever 510 slidably supports the base part 610 of the wiper strip 600.

Referring to FIGS. 1, 2, 3*a* and 3*b*, the backing plate 700 may have a curvature in order to fit the curvature of the glass surface 30*a*. According to the embodiment, when the curvature of the wiper blade 10 is maintained by the first lever 510 and the second lever 520, the backing plate 700 may have no curvature. The lever assembly 500 and the cover 400 distribute the pressurizing force applied from the wiper arm to the wiper strip 600.

Each of the pair of the first levers 510 includes two first fasteners 511, two first through holes 512 and two arm parts 513. The first lever 510 is formed to have a mountain fold extending in a longitudinal direction by press-processing a metal plate. The first lever 510 is formed to have an arch shape of which a center is convex toward the cover 400. The first lever 510 is formed to have a U-shaped cross section which is opened to the lower portion thereof.

The first through hole 512 of the first lever 510 may be formed in the center of the first lever 510 for a hinge coupling to the second lever 520. The first through hole 512 is opened in a width direction of the first lever. The first through hole 512 is coupled to a second through hole 522 of the second lever 520 described below. The first through hole 512 and the second through hole 522 are more securely coupled to each other by inserting and fitting a second spacer 532 between the first through hole 512 and the second through hole 522. The first fastener 511 for supporting the wiper strip 600 is formed on both ends of the first lever 510. The first fastener 511 slidably supports the wiper strip 600.

As a result, the lever assembly 500 according to the embodiment of the present invention is comprised of two symmetrical portions including the one first lever 510 and the one second lever 520. The second levers 520 are connected to each other through the cover 400. That is, the cover 400 formed of a resin material functions as a lever which may be commonly formed of a metallic material, so that the weight of the entire wiper blade 10 may be reduced. When the cover 400 is formed of a resin material instead of a metallic material, the cover 400 can be integrally formed, so that the number of parts can be reduced. Therefore, processes can be simplified and manufacturing costs can be reduced. Moreover, since the cover 400 is formed of a resin material, the flexibility of the external appearance of the wiper blade 10 may be increased. With the increase of the flexibility of shape of the cover 400, it is easier to transform the cover 400 in order to prevent lifting caused by traveling wind.

Figure 7:
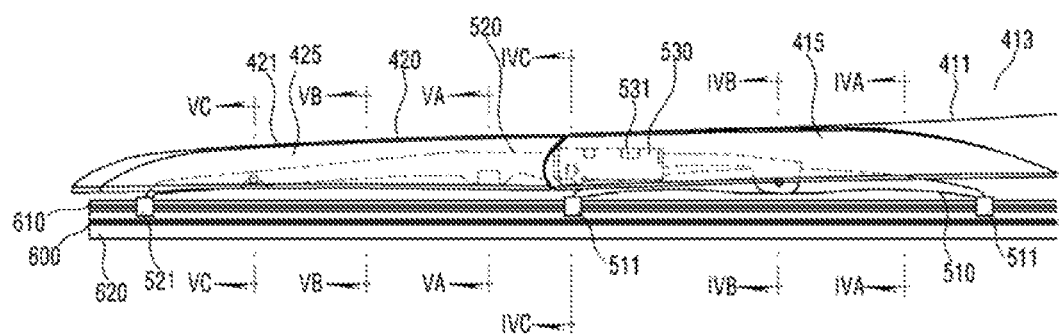
FIG. 7 is a perspective plan view of the cover and the lever assembly of the wiper blade according to the present invention.

FIG. 7 is a front perspective plan view showing that the cover 400 and the lever assembly 500 of the wiper blade 10 have been coupled to the wiper strip 600 of the wiper blade 10. FIGS. 8*a* to 8*f* are axial directional cross-sectional views with respect to VC to IVA in FIG. 7. Referring to FIGS. 8*a* to 8*f*, a transverse centerline of the first lever 510 is L2. The center of the transverse length of the upper portion of the second lever 520 corresponds to L2. Hereafter, L2 is referred to as a transverse centerline of the lever assembly 500. The transverse centerline L2 of the lever assembly 500 is offset from a transverse centerline L1 of the wiper strip 600. The first fastener 511 of the first lever 510 may have a yoke shape.

Figure 8A:
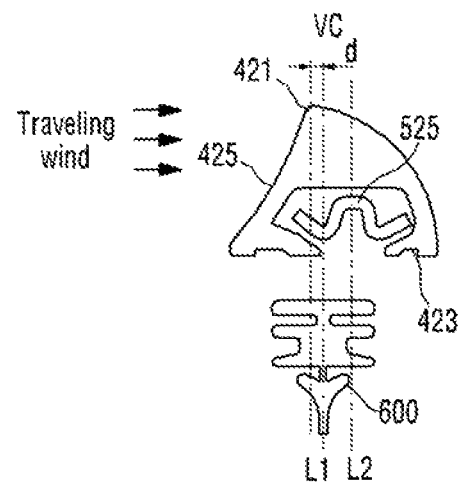
FIG. 8a is an axial directional cross-sectional view with respect to VC in FIG. 7.
Figure 8B:
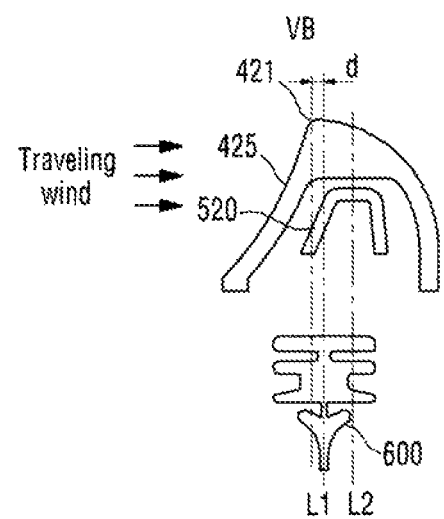
FIG. 8b is an axial directional cross-sectional view with respect to VB in FIG. 7.
Figure 8C:
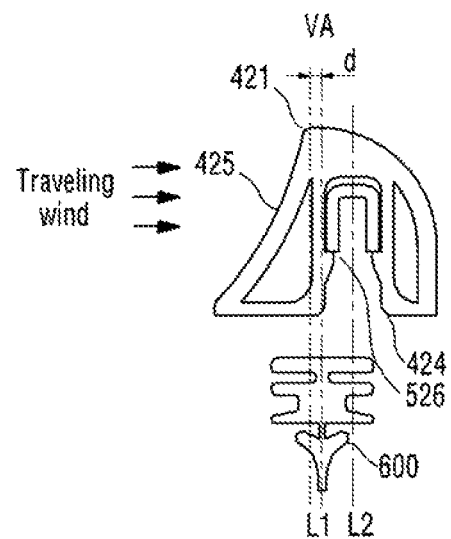
FIG. 8c is an axial directional cross-sectional view with respect to VA in FIG. 7.
Figure 8D:
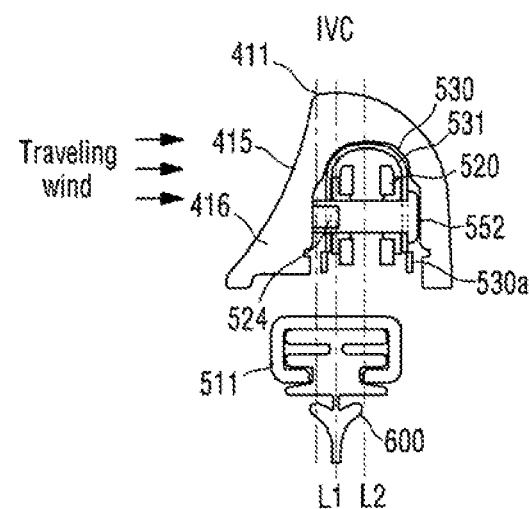
FIG. 8d is an axial directional cross-sectional view with respect to IVC in FIG. 7.

As the axial directional cross-section with respect to IVC of FIG. 7 is shown in FIG. 8*d*, the transverse centerline of the first fastener 511 corresponds to the transverse centerline L1 of the wiper strip 600.

As shown in FIGS. 4 and 5, the second lever 520 transfers the pressurizing force caused by the wiper arm 20 to the first lever 510. Further, the second lever 520 supports the wiper strip 600. The second lever 520 is coupled to the cover 400 to maintain a whole shape of the wiper blade 10. Each of a pair of the second levers 520 includes the second fastener 521 for supporting the wiper strip 600, the second through hole 522 for a hinge coupling to the first lever 510, two arm parts 523*a* and 523*b*, a third through hole 524 for a coupling to a central cover (fixing cover) 410, a first connection groove 525 and a second connection groove 526 for a coupling to a side cover (moving cover) 420 of the cover 400.

The second lever 520 is formed in an arch shape toward the cover 400. The second lever 520 is formed to have a U-shaped cross section which is opened to the lower portion thereof. Accordingly, the central directional arm part 523*a* of the second lever 520 may receive a portion of the first lever 510. Since the lower portion of the cross section of the second lever 520 and the cross section of the first lever 510 have all U-shape, it is possible to reduce a gap between the first lever 510 and the second lever 520 when a portion of the first lever 510 is received in the second lever 520. As a result, a wiping performance can be maintained satisfactory by causing the wide blade 10 to contact more closely with the glass surface.

The arm part 523 includes the wiper central directional arm part 523a and the front end directional arm part 523b. The wiper central directional arm part 523a of the second lever 520 has the second through hole 522 formed therein and is hinge-coupled to the first lever 510. The second through hole 522 may be formed in one end of the second lever 520.

Figure 8E:
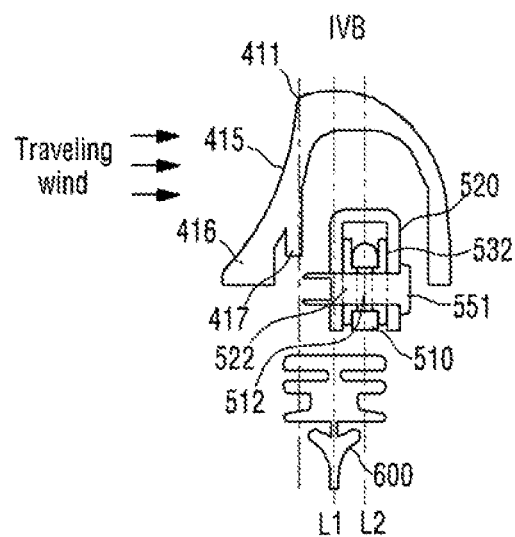
FIG. 8e is an axial directional cross-sectional view with respect to IVB in FIG. 7.

As shown in FIG. 8e, a first connecting pin 551 passes through the first through hole 512 and the second through hole 522 and then couples the first lever 510 to the second lever 520. Also, as shown in FIG. 8d, a second connecting pin 552 passes through the third through hole 524 and then couples the second lever 520 to the cover 400.

The first connection groove 525 and the second connection groove 526 for the coupling to the cover 400, and the second fastener 521 for supporting the wiper strip are formed in the front end directional arm part 523b of the second lever 520. Though not shown, similarly to the first fastener 511 of the first lever 510, a transverse centerline of the second fastener 521 corresponds to the transverse centerline L1 of the wiper strip 600. The second fastener 521 may have a yoke shape. Further, the third through hole 524 for the hinge coupling to the cover 400 is formed in the second lever 520.

Figure 9:
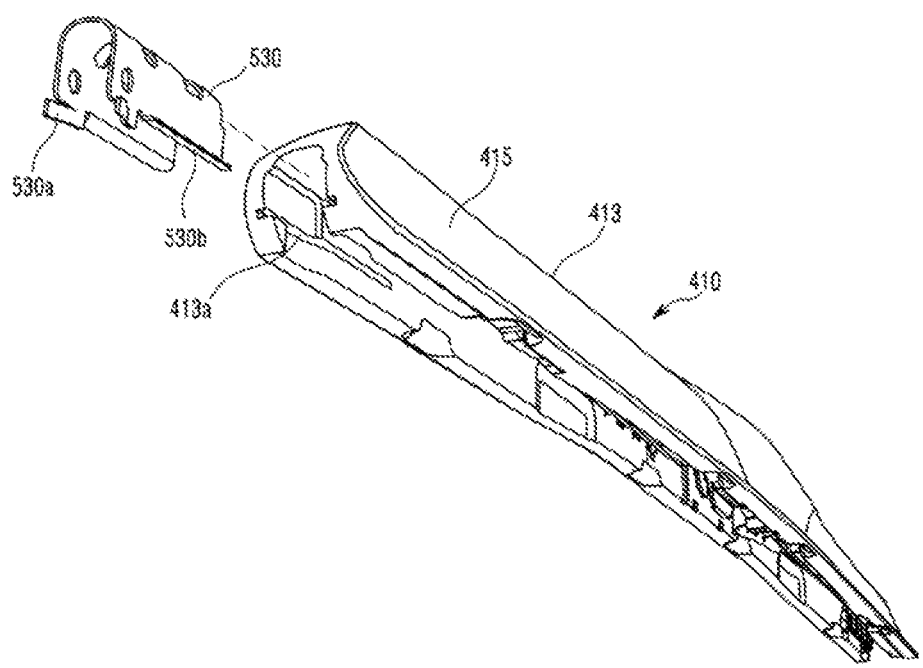
FIG. 9 is a perspective view showing that a connection clip is inserted and fitted to a central cover.

As shown in FIG. 4, the second lever 520 may further include a first spacer 531 and a spacer clip 530 in order to be coupled to the cover 400. FIG. 9 shows a coupling structure of the central cover and the spacer clip. Referring to FIGS. 4, 5, 8d and 9, the first spacer 531 is provided at a position where the third through hole 524 of the second lever 520 is located, and the spacer clip 530 is provided between the first spacer 531 and the central cover 410. The first spacer 531 is inserted between the second lever 520 and the central cover 410, thereby strengthening the hinge-coupling structure between the second lever 520 and the cover 400. The spacer clip 530 may be inserted between the first spacer 531 and the central cover 410. The spacer clip 530 reduces a gap between the second lever 520 and the central cover 410 and pressurizes the second lever 520. As a result, the wiper strip 600 contacts more closely with the glass surface of the wiper strip 600.

The spacer dip 530 has an arch-shaped, transverse cross section and is rectangularly formed to surround the first spacer 531 in the longitudinal direction thereof. A rib 530b is formed at the outside of the lower portion of the spacer clip 530 in the longitudinal direction of the central cover 410.

As shown in FIG. 9, regarding the spacer clip 530, the rib 530b may be coupled to a slot 413a of the central cover 410 in a sliding manner. When the rib 530b is coupled to a slot 413a of the central cover 410, an elastic latch 530a is caught by the end portion of the slot 413a so that the backward movement of the spacer clip 530 is restrained and the coupling is strengthened. The first spacer 531 and the spacer clip 530 are integrally fixed and the second lever 520 is able to rotate about the central cover 410.

The first spacer 531 may be formed of a resin material and the spacer clip 530 may be formed of a metallic material. The first spacer 531 formed of a resin material prevents abrasion caused by friction between the metallic spacer clip 530 and the metallic second lever 520 and reduces a gap between the spacer clip 530 and the metallic second lever 520, thereby causing the spacer clip 530 to more pressurize the second lever 520. When the wiper blade is operated, the first spacer 531 and the spacer clip 530 receive the pressurizing force applied to the central cover 410 and reinforce the rigidity of the central cover 410.

The second spacer 532 is inserted into a portion where the first lever 510 and the second lever 520 are hinge-coupled, thereby strengthening the coupling of the second lever 520 and the first lever 510. Also, the second spacer 532 which is inserted into the metallic first lever 510 and the metallic second lever 520 may be formed of a resin material. Therefore, there is an effect of reducing abrasion caused by friction between the metallic first lever 510 and the metallic second lever 520 and of preventing a gap between the metallic first lever 510 and the metallic second lever 520.

As shown in FIGS. 4 and 5, the third through hole 524 and the first fastener 511 located at the front end of the first lever 510 may be formed separately from the front end of the wiper blade 10 by the same distance. That is, a pivot axis of the second lever 520 is on the same line with the first fastener 511 located at the front end of the first lever 510. If the third through hole 524 is closer to the front end than the first fastener 511, an excessive load is distributed to the second fastener 521 and a relatively less load is distributed to the first fastener 511. Accordingly, the first fastener 511 is not able to give a predetermined pressure to the glass surface, so that a wiping performance of the first fastener 511 is degraded. On the contrary, if the first fastener 511 is closer to the front end than the third through hole 524, a load is not sufficiently transferred to the second fastener 521, so that a wiping performance of the second fastener 521 is degraded. However, there is no limit to this. A longitudinal length of the first lever 510, i.e., a distance between the first fasteners 511 can be controlled according to the curvature of the glass surface of a vehicle.

Figure 10A:
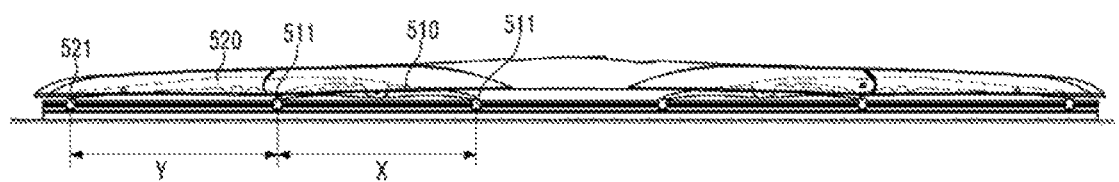
FIGS. 10a and 10b show the wiper blade based on a curvature of a glass surface.
Figure 10B:
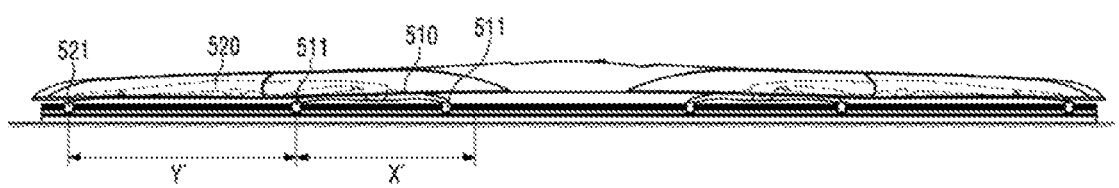

FIGS. 10a and 10b show the wiper blade based on a curvature of a glass surface. The glass surface 30a has a convex curvature to the front side of the vehicle. Accordingly, in order that the wiper strip 600 wipes stably the glass surface, the pressurizing force applied to the end of the wiper strip 600 should become greater.

According to the embodiment of the present invention, four first fasteners 511 of the first lever 510 and two fasteners 521 of the second lever may support the wiper strip 600. As shown in FIG. 4, in the load distribution of the fasteners 511 and 521, a pressurizing force applied to the fastener 521 of the second lever 520 is greater than a pressurizing force applied to the fastener 511 of the first lever 510.

Here, the curvature of the glass surface is different for each vehicle. Therefore, when the curvature is increased, a wiping performance may be degraded by the lifting of the wiper blade. Specifically, with the increased curvature, when the wiping blade 10 wipes, a pivot distance of the second lever 520 is increased and a pivot distance of the first lever 510 which is hinge-coupled to one end of the second lever 520. Accordingly, despite the fact that the first lever 510 should be received more deeply into the lower portion of the central portion 410, the central directional first fastener 511 of the first lever 510 meets the lower portion of the second lever 520, so that the first lever 510 is not sufficiently received. As a result, the second lever 520 is not able to easily pivot.

Further, when a vehicle moves at a high speed, the wiper lifts up due to traveling wind. The lifting of the wiper reduces a pressurizing force to the wiper strip 600 of the lever assembly 500. When the pressurizing force applied to the wiper strip 600 is reduced, tire wiper blade 10 is not able to contact closely with the glass surface because the backing plate 700 received in the wiper strip 600 is made of an elastic material having a spring characteristic. As a result, the lever assembly 500 is not able to easily pivot and is difficult to contact closely with the glass surface. Consequently, a wiping performance may be degraded. Therefore, in the embodiment of the present invention, distances X and Y between the fasteners 511 and 521 are changed according to the curvature of the glass surface. As a result, it is possible to reduce the lifting of the wiper blade and to provide the wiper blade having a good wiping performance through the smooth pivoting of the second lever 520. In other words, the pressurizing force applied to the fasteners 511 and 521 can be controlled by adjusting the distances X and Y between the fasteners 511, and 521 in spite of the same entire length of the wiper blade 10.

For example, referring to FIG. 10a, the entire length of the wiper blade 10 is 600 mm with respect to a 24-inch glass surface. The distance X between the first fasteners 511 located at both ends of the first lever 510 is 118 mm. Here, when the curvature of the glass surface is increased, the first lever 510 of which a distance X' between the first fasteners 511 located at both ends of the first lever 510 is 104. 8 mm may be employed as shown in FIG. 10b. That is, since the pressurizing force applied to the second fastener 521 is increased with the decrease of the distance X between the first fasteners 511 of the first lever 510, the pressurizing force applied to both ends of the wiper strip 600 is increased and the wiping is stably performed. Also, when the distance X between the first fasteners 511 of the first lever 510 is reduced, the first lever 511 is received closer to the central cover 510. Accordingly, the second lever 520 is able smoothly to pivot without being prevented. As such, a good wiping performance of the wiper blade 10 can be obtained by adjusting the distance X between the fasteners 511 of the first lever 510 in accordance with the curvature of the glass surface 31a.

The distances X and X' between the first fasteners 511 are just examples. Any distances X and X' between the first fasteners 511 can be changed according to the curvature of the glass surface of a vehicle.

Referring to FIG. 7, the cover 400 receives the lever assembly 500 and distributes the pressurizing force from the wiper arm to the lever assembly 500, thereby causing the wiper strip 600 to more closely contact with the glass surface. As shown in FIGS. 4, 5, and 7, the cover 400 includes the central cover 410 and the two side covers 420. The covers 410 and 420 include finned sections 415 and 425 according to the present invention. Upper front ends of the finned sections 415 and 425 of the cover 400 are comprised of an upper front end 411 of the central finned section 415 formed in the central cover 410 and an upper front end 421 of the side finned section 425 formed in the side cover 420.

The side covers 420 are located on both ends of the central cover 410, respectively. The central cover 410 and the side cover 420 are made of a resin material respectively and have a predetermined rigidity. Further, the central cover 410 and the side cover 420 are coupled to each other to configure the cover 400, and the cover 400 extends in a longitudinal direction of the wiper blade 10. A length of the longitudinal direction of the cover 400 is greater than a length of a longitudinal direction of the lever assembly 500. The cover 400 together with the wiper strip 600 forms an integrally external appearance.

Referring to FIGS. 8a to 8e, the entire cross section of the second lever 520 including the first connection groove 525, the front end directional arm part 523b and the second connection groove 526 has a lower space having a trapezoidal shape. Therefore, when the wiper blade 10 wipes the glass surface of a vehicle, durability of the wiper blade 10 is enhanced with respect to a torsional moment transferred to the wiper blade 10 in accordance with the change of the wiping direction.

Figure 11A:
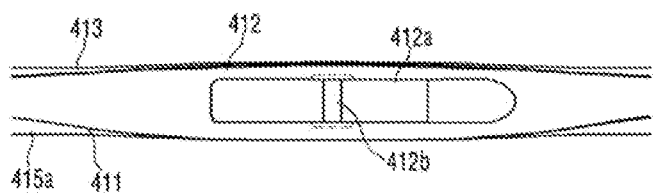
FIG. 11a is a top plan view of a connection holder part of the wiper blade according to the present invention.
Figure 11B:
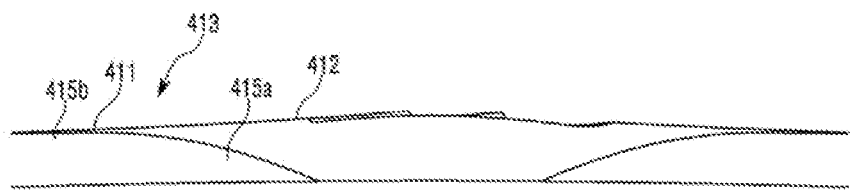
FIG. 11b is a front view of the connection holder part of the wiper blade according to the present invention.
Figure 11C:
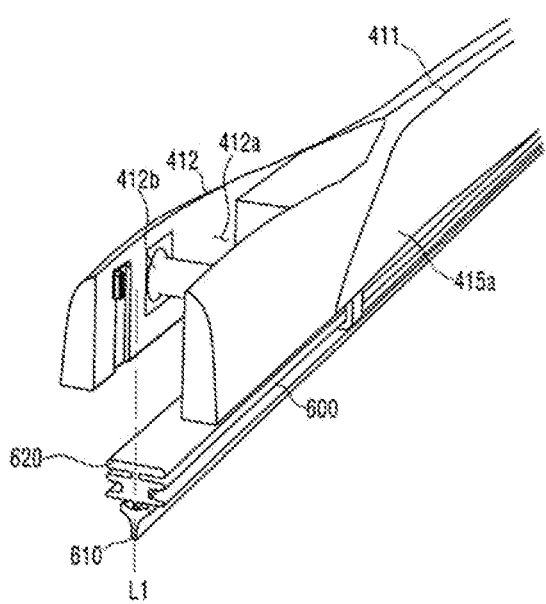
FIG. 11c is an exploded perspective view of the connection holder part of the wiper blade according to the present invention.

FIG. 11a is a top plan view of a connection holder part of the wiper blade according to the present invention. FIG. 11b is a front view of the connection holder part, of the wiper blade according to the present invention. FIG. 11c is an exploded perspective view of the connection holder part of the wiper blade according to the present invention. Referring to FIGS. 1, 2, 4, 5, 11a, 11b and 11c the central cover 410 includes a connection holder part 412 for a connection with the wiper arm, a pair of first lever covers 413 and a pair of the central finned sections 415. Each of the pair of the central finned sections 415 has the central finned section upper front end 411 formed therein.

As shown in FIG. 5, the connection holder part 412 is located approximately in a center of the central cover 410, a lower portion of the connection holder part 412 does not receive the lever assembly 500, and an opening 412a for a coupling to the wiper arm may be formed in the connection holder part 412. The lever cover 413 is disposed on both ends of the connection holder part 412 so as to cover the entire first lever 510. The central cover 410 is formed to have the arch shape convex toward the wiper arm, thereby causing the wiper strip 600 to indirectly contact more closely with the glass surface of a vehicle by applying an external force to the lever assembly 500.

As shown in FIGS. 5, 11a, 11b, and 11c, the connection holder part 412 does not receive the lever made of a metallic material therein, so that a degree of freedom of a shape is increased. That is, it is easy to form the finned section in the connection holder part 412. In other words, the external shape of the connection holder part 412 may include a connection holder part finned section 415a in such a manner as to efficiently distribute a pressurizing force to the entire wiper blade 10 in accordance with traveling wind when the vehicle is driven. The connection holder part finned section 415a distributes air flows to the front end of the cover 400 to prevent the wiper blade 10 from lifting.

Figure 8F:
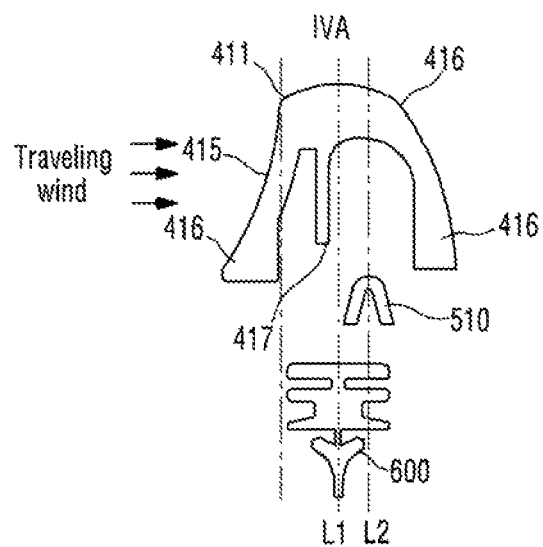
FIG. 8f is an axial directional cross-sectional view with respect to IVA in FIG. 7.

Referring FIGS. 8d, 8e, and 8f, a thickened portion 416 is installed in each internal vertex of the cross section of the central cover 410. Accordingly, the central cover 410 increases resistance to a torsional moment and rigidity. A rib 417 is provided at an interior of the central cover 410 in order to prevent a gap between internal structures. The rib 417 is formed within the central cover 410 and reduces a gap between the central cover 410 and the first lever 510 received in the central cover 410. As a result, the lateral movement of the first lever 510 is limited and thus the wiping is stably performed.

Referring to FIGS. 11a and 11c, the connection holder part 412 is formed to have parallel walls, and the transverse center of the connection holder part 412 corresponds to the transverse centerline L1 of the wiper strip 600. A vehicle front exterior of the connection holder part 412 may include the connection holder part finned section 415a in a lower portion thereof. An upper front end of the connection holder part finned section 415a forms a portion of a curve which starts from the lower portion of the connection holder part 412 and meets the central finned section upper front end 411, i.e., the upper front end of the cover 400 with the approach to both ends of the wiper blade 10. Accordingly, the central finned section 415 formed in the central cover 410 forms a finned section formed integrally with the first lever cover 413 and the connection holder part 412, and makes it easier to transfer a pressurizing force caused by traveling force to the entire cover 400.

The adaptor part (not shown), which can be coupled to the connector (not shown), may be provided within the connection holder part 412 in a front side of the vehicle. The edge of the opening 412a of the connection holder part 412 is rounded and transfers stress concentrated on the opening 412a of the connection holder part 412 to the first lever cover 413 of the central cover 410.

Referring to FIG. 11a, the connection holder part 412 is rotatably connected to the front end of the wiper arm through a connection, clip 412b. The connection clip 412b is a component used to connect the connection holder part 412 with the connector (not shown). The connection clip 412b of the present invention is made of a flexible material which is tougher than a conventional material. Since the connection, clip 412b is made of a tougher material, the connection clip 412b can be prevented from being damaged by friction between the wiper arm and the connection clip 412b. When the wiping is performed, the most torsional moment and stress caused by torsion are applied to the connection clip 412b. Therefore, the tough and flexible material is used as a material of the connection clip 412b, thereby improving resistance to the torsional, moment and stress which are applied to the connection holder pan. The connection clip 412b is more flexible than the cover 400. Therefore, even though the connection clip 412b is inserted into the inside of the connection holder part 412, the connection holder part 412 is not projected. Accordingly, the external appearance is not affected, and thus integrality of the shapes of the finned sections 415 and 425 can be maintained. As a result, the connection clip 412b is able to function to reinforce the rigidity of the cover 400 when the cover 400 is made of a resin material.

Referring to FIGS. 4, 5, 8e, 8f, 11a, 11b and 11c, the first lever covers 413 are located on both ends of the central cover 410 and extend in the longitudinal direction of the wiper blade 10. The first lever cover 413 has an opening in the lower portion thereof, and the opening is formed to have a U-shape to receive the first lever 150. The central directional arm part 523a of the second lever 520 receives a portion of the first lever 510. The first lever cover 413 receives the central directional arm part 523a of the second lever 520. The central finned section 415 of the central cover 410 includes the connection holder part finned section 415a formed in the connection holder part and a first lever cover finned section 415b formed in the first lever cover 413. The connection holder part tinned section 415a and the first lever cover finned section 415b integrally form the central finned section 415. The connection holder part finned section 415a is formed in the connection holder part 412 of the wiper blade 10 and distributes traveling wind from a front side of the vehicle from side to side. The connection holder part finned section 415a extends from the lower portion of the connection holder part 412 to both front ends of the wiper blade 10. The first lever cover finned section 415b is formed in the first lever cover 413 and causes the traveling wind to flow from side to side or upward.

The first lever cover 413 is integrally formed with the central finned section 415. The central finned section 415 generating a pressurizing force pressurizing the wiper strip 600 against the glass surface by receiving the traveling wind applied to a vehicle being driven is formed to be inclined.

Referring to FIGS. 4, 5, 6, 8a, 8b and 8c, the side cover 420 receives at least a portion, of the second lever 520. The side cover 420 has an opening in a lower portion thereof. The opening is formed to have a U-shape to receive the second lever 520. As shown in FIGS. 8a, 8b and 8c, an upper front end 421 of the side finned section 425 is offset at a predetermined distance to a transverse one side of the transverse centerline L1 from the transverse centerline L1 of the wiper strip 600.

The side cover 420 includes the side finned section 425 extending from the finned section 415b of the first lever cover 413. The side cover 420 receives the front end directional arm part 523b of the second lever 520. The side finned section 425 is formed concave toward the wiper strip 600 from the side finned section upper front end 421 offset from the transverse centerline of the wiper blade 10. The inner lower portion of the side cover 420 should have a space for receiving the second lever 520. Therefore, the inner lower portion of the side cover 420 should have should have a predetermined depth in such a manner as to receive the second lever 520. When the side finned section upper front end 421 is formed on the rear side of the vehicle, the depth of the receiving space formed in the inner lower portion of the side cover 420 becomes smaller, and thus the second lever 520 cannot be completely received. In the embodiment of the present invention, the side finned section upper front end 421 is offset from the transverse centerline L1 of the wiper strip 600 in a front direction of the vehicle such that the second lever 520 is completely received and prevented from being shaken, so that the wiping can be stably performed.

Also, as shown in FIGS. 8a to 8c, the offset "d" of the side finned section 425 is maintained constant along the front end of the side cover 420. Accordingly, the traveling wind flows in a top direction of the wiper blade 10. As a result, the lifting and chattering of the wiper blade 10 are prevented. That is, when a vehicle is driven, the traveling wind flows from the central portion of the wiper blade 10 to the right and left and upper side of the cover 400 along the finned sections 415 and 425. As a result, the upper front ends 411 and 421 of the finned sections 415 and 425 are offset from a transverse centerline L1 of the wiper blade 10 to the front side of the vehicle, so that even though the transverse lengths of the finned sections 415 and 425 are relatively small, the wiper blade 10 maintains an excellent wiping performance.

Referring to FIG. 4, the side cover 420 includes a support protrusion 422 supporting the second lever 520. An upper portion of the second, fastener 521 of the second lever 520 is supported by the support protrusion 422 of the side cover 420. The support protrusion 422 prevents transformation due to a moment of the second lever 520 by preventing the second fastener 521 of the second lever 520 from rotating in a direction of the side cover 420. Further, the side cover 420 includes a first coupling protrusion 423 and a second coupling protrusion 424 which integrally couple the second lever 520 with the side cover 420 and prevent the second lever 520 from being separated from the side cover 420.

Referring to FIGS. 4, 5, 8a, 8b and 8c, the side finned section 425 is integrally formed with an upper portion surface of the side cover 420. More specifically, the finned section 425 is implemented by a shape change of the upper portion surface of the side cover 420. The finned section 425 functions to induce an air flow such that air moving to a glass side of the vehicle pressurizes the side cover 420 in a direction closer to the vehicle glass 30 when the wiping is performed.

Referring to FIGS. 8a to 8c, the first coupling protrusion 423 may be formed to protrude inwardly from a bottom of the side cover 420 and may form a space for receiving the second lever 520. A lower end of the first connection groove 525 of the second lever 520 may be formed to be outwardly bent in order to be coupled to and received in the formed space. Accordingly, the first connection groove 525 is caught by the first coupling protrusion 423, and thus the second lever 520 is prevented from being separated from the side cover 420. As shown in FIGS. 7b and 7c, a transverse width of the front end directional arm part 523b of the second lever 520 is greater than a transverse width of the second connection groove 526. That is, the second coupling protrusion 424 of the side cover 420 is elastically coupled to the second lever 520 by transversely pressurizing the second connection groove 526 of the second lever 520, and prevents the second lever 520 from being separated from the side cover 420.

Figure 12:
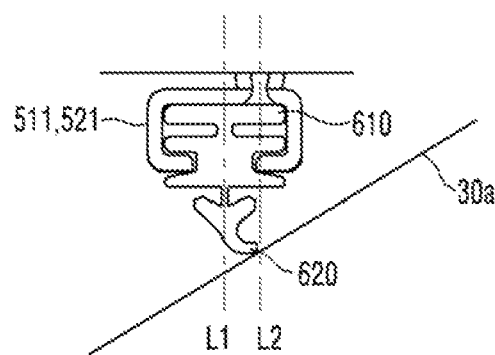
FIG. 12 is a cross sectional view of the wiper strip when the wiper blade according to the present invention is in a stationary state.

FIG. 12 is a cross sectional view of the wiper strip 600 when the wiper blade 10 is in a stationary state. As shown in FIG. 12, when the wiper blade 10 is in a stationary state, the wiper strip 600 is inclined to some degree with respect to the glass surface 30a of a vehicle and contacts with the glass surface 30a. In more detail, the wiper blade 10 is inclined at about 6 degree with respect to the normal of the glass surface 30a in a direction of a rear side of the vehicle. Here, since the wiping lip part 620 of the wiper strip 600 is made of an elastic material, the wiping lip part 620 is bent toward the rear of the vehicle. The transverse centerlines of the fasteners 511 521 correspond to the transverse centerline L1 of the wiper strip 600. However, as shown in FIG. 12, the transverse centerline L2 of the first lever 510 and the second lever 520 is offset from the transverse centerline L1 of the wiper strip 600 at a certain distance toward the rear side of the vehicle.

As shown in FIGS. 8a to 8f, the finned sections 415 and 425 are formed in the cover 400 on the windward side of the traveling wind, so that a lower space of the cover 400 including the finned sections 415 and 425 formed therein becomes smaller than the rear side of the vehicle which has no finned section. The cover 400 receives the lever assembly 500 and provides a space in which the lever assembly 500 pivots when the wiper blade is operated. Accordingly, the transverse centerline L2 of the lever assembly 500 is offset from the transverse centerline L1 of the wiper strip 600 toward the rear side of the vehicle, so that the lever assembly 500 is able to smoothly pivot under the cover 400 without being affected by the finned sections 415 and 425.

Additionally, when the transverse centerline L2 of the lever assembly 500 is offset from the transverse centerline L1 of the wiper blade 10, the magnitude of the moment applied to the wiping lip part 620 becomes less than that of the moment when the transverse centerline L2 of the lever assembly 500 corresponds to the transverse centerline L1 of the wiper blade 10. Accordingly, because the transverse centerline L2 of the levers 510 and 520 is offset from the L1, a permanent transformation rate of the wiping lip part 620 is reduced, so that the life span of the wiper blade can be lengthened.

The features, structures and effects and the like described in the embodiments are included in at least one embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the present invention has been described based on the preferred embodiment thereof, the embodiment is only illustrative and does not limit the present invention. It can be understood that those skilled in the art can achieve various modifications and applications that are not shown herein, without departing from the essential characteristics of the present invention. That is, each component described in the embodiments in detail may be modified and then implemented in various ways. Furthermore, it should be understood that the differences associated with the modifications and applications are included in the scope of the present invention, which is defined in the accompanying claims.

What is claimed is:

1. A wiper blade comprising:
a wiper strip which directly wipes a wiping surface;
a lever assembly which supports the wiper strip and comprises a pair of first levers and a pair of second levers;
a cover which receives the lever assembly and comprises a fixing cover and at least one moving cover which is pivotable with respect to the fixing cover;
a first spacer which is provided in a central portion of each second lever and pressurizes each second lever from the outside of the second lever; and
a spacer clip which is inserted between the first spacer and the fixing cover, the spacer clip having an arch-shaped cross section and being made of a metallic material, wherein:
the lever assembly supports six points of the wiper strip by means of the pair of the first levers, each of which supports two points of the wiper strip;
the pair of the second levers, each of which is hinge-coupled to one of the pair of the first levers, is coupled to the cover and supports two points of the wiper strip;
the spacer clip comprising:
a spacer rib allows the spacer clip to be coupled in a sliding manner to a slot formed within the fixing cover, and
an elastic latch is caught by an outer end portion of the slot and restrains backward movement of the spacer clip, and is formed in a rear end of the spacer clip in the insertion direction of the spacer clip.

2. A wiper blade comprising:
a wiper strip which directly wipes a wiping surface;
a lever assembly which supports the wiper strip and comprises two pairs of first levers and a pair of second levers;
a cover which receives the lever assembly and comprises a fixing cover and at least one moving cover which is pivotable with respect to the fixing cover;
a first spacer which is provided in a central portion of each second lever and pressurizes each second lever from the outside of the second lever; and
a spacer clip which is inserted between the first spacer and the fixing cover, the spacer clip having an arch-shaped cross section and being made of a metallic material, wherein:
the pair of the second levers, each of which is coupled to the cover and is hinge-coupled to one pair of the two pairs of the first levers; and
each pair of the two pairs of the first levers supports four points of the wiper strip;
the spacer clip comprising:
a spacer rib allows the spacer clip to be coupled in a sliding manner to a slot formed within the fixing cover, and
an elastic latch is caught by an outer end portion of the slot and restrains backward movement of the spacer clip, and is formed in a rear end of the spacer clip in the insertion direction of the spacer clip.

3. The wiper blade of claim 1, wherein the moving cover is fixed and coupled to each second lever and is located on both ends of the fixing cover.

4. The wiper blade of claim 1, wherein the first spacer is made of a resin material.

5. The wiper blade of claim 1, wherein an axial direction cross section of a lower space of each second lever has a trapezoidal shape.

6. The wiper blade of claim 1, wherein a distance between first fasteners of each first lever is increased or decreased according to a curvature of the wiping surface.

7. The wiper blade of claim 1, wherein the cover comprises finned sections which form an upper front end of the cover, the finned sections are integrally formed with the cover in such a manner as to be as a whole concave toward the wiper strip.

8. A wiper blade comprising:
a wiper strip which directly wipes a wiping surface;
a lever assembly which supports the wiper strip;
a cover which receives the lever assembly, the cover comprising a central finned section and a pair of side finned sections;

a first spacer which is provided in the lever assembly and pressurizes the lever assembly from the outside of the lever assembly;

a spacer clip which is inserted between the first spacer and the cover, the spacer clip having an arch-shaped cross section and being made of a metallic material, wherein:

a transverse centerline of the lever assembly is offset from a transverse centerline of the wiper strip to a rear side of a vehicle;

a constant offset, to a front side of the vehicle, is maintained between each of the side finned sections and the transverse centerline of the wiper strip; and the spacer clip comprises:

a spacer rib allows the spacer clip to be coupled in a sliding manner to a slot formed within the cover, and an elastic latch is caught by an outer end portion of the slot and restrains backward movement of the spacer clip, and is formed in a rear end of the spacer clip in the insertion direction of the spacer clip.

9. The wiper blade of claim 8, wherein the cover comprises a fixing cover and at least one moving cover which is pivotable with respect to the fixing cover.

10. The wiper blade of claim 9, wherein the at least one moving cover is fixed and coupled to the lever assembly and is located on both ends of the fixing cover.

11. The wiper blade of claim 8, wherein the cover comprises finned sections which form an upper front end of the cover and are integrally formed with the cover in such a manner as to be as a whole concave toward the wiper strip.

* * * * *